US009792654B1

(12) United States Patent
Limas et al.

(10) Patent No.: US 9,792,654 B1
(45) Date of Patent: Oct. 17, 2017

(54) INSURANCE CLAIM PROCESSING VIA STREAMING VIDEO

(71) Applicants: Shanna Limas, San Antonio, TX (US); Cleburne Burgess, Fair Oaks, TX (US); Jon McEachron, Boerne, TX (US)

(72) Inventors: Shanna Limas, San Antonio, TX (US); Cleburne Burgess, Fair Oaks, TX (US); Jon McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/837,883

(22) Filed: Mar. 15, 2013

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC .... G06F 3/005; G06Q 30/0283; G06Q 40/00; G06Q 40/08; G06Q 50/188
See application file for complete search history.

(56) References Cited

U.S. PATENT DOCUMENTS

| | | | | |
|---|---|---|---|---|
| 8,019,629 | B1* | 9/2011 | Medina | G06Q 40/08 705/4 |
| 2003/0046705 | A1* | 3/2003 | Sears | H04N 7/147 725/106 |
| 2004/0243714 | A1* | 12/2004 | Wynn | H04L 67/42 709/231 |
| 2008/0303940 | A1* | 12/2008 | Baker | 348/445 |
| 2009/0204882 | A1* | 8/2009 | Hollander | G06F 17/241 715/230 |
| 2010/0210240 | A1* | 8/2010 | Mahaffey | H04L 41/0253 455/411 |
| 2011/0249075 | A1* | 10/2011 | Abuan | H04N 7/147 348/14.02 |

\* cited by examiner

*Primary Examiner* — Kirsten Apple
*Assistant Examiner* — Michael W Anderson
(74) *Attorney, Agent, or Firm* — Brinks Gilson & Lione

(57) ABSTRACT

Methods and systems are disclosed for processing insurance claims in a manner that reduces or eliminates a need for an adjuster to visit an insured person or property of the insured person. The method includes receiving a query from an insured regarding a claim and determining if the insured has a mobile device with a video camera capable of streaming video to the insurance claim processing system. If a mobile device capable of streaming video is available, the system generates an electronic invitation to a one-way streaming video session and transmits the electronic invitation to the mobile device. Upon acceptance, the system initiates the one-way video session, receives real-time streaming video, and appends received video from the real-time streaming video to a claim workfile. In alternative implementations, the system can remotely control the camera and other features of the mobile device during the one-way streaming video session.

24 Claims, 4 Drawing Sheets

INSURANCE CLAIM PROCESSING VIA STREAMING VIDEO

TECHNICAL FIELD

This application relates generally to a method and system for handling insurance claim processing.

BACKGROUND

Insurance claim management typically includes a great deal of manual input and analysis by members of an insurance company. One portion of claims processing that can take a great deal of time and resources is the process of having a claims adjuster visit the insured property to assess damage. Although an insurance company can be diligent and send an adjuster or other damage assessment specialist out relatively quickly, the adjuster will need some amount of time to schedule the visit and to get to the appropriate location at the time of the scheduled visit. The adjuster requires a fixed amount of overhead (vehicle, office, equipment) to perform his or her tasks. The time the adjuster spends traveling is not useful to the insurance company or the insured, and it may be that an adjuster can see one or two cases on any given day due to the location of the insured property. There may also be a delay between the time the adjuster views the property and the time the report is prepared and submitted to the insurer. In some situations, the initial adjuster sent out to assess the damage may not have the necessary expertise to assess a specific type of damage. In those situations, a different specialist would need to be contacted and scheduled for a follow-up visit at a later time.

Accordingly, there is a need for providing a more efficient way of utilizing adjuster resources to improve claim processing time and reduce costs for the insurer.

SUMMARY

In order to address the challenge noted above, a system and method for handling insurance claim processing using streaming video in the claim adjustment process is described.

According to a first aspect, a method is disclosed where a processor in an insurance claim processing system receives a query regarding an insurance claim from an insured located remotely from the insurance claim processing system. In response to the query the processor determines if the insured has a mobile device capable of streaming video to the insurance claim processing system. If it is determined that the insured has a mobile device capable of streaming video, the processor generates an electronic invitation to a one-way streaming video session and transmits the electronic invitation to the mobile device. Upon receiving an acceptance of the invitation, a one-way video session is initiated and the processor receives real-time streaming video from the mobile device. The processor may then append received video from the real-time streaming video to an insurance claim workfile at the insurance claim processing system.

In yet another aspect of the invention, an insurance claim processing system includes a memory having processor executable instructions in communication with a processor, where the processor is arranged to execute one or more of the method steps described above.

DETAILED DESCRIPTION

Figure 1:
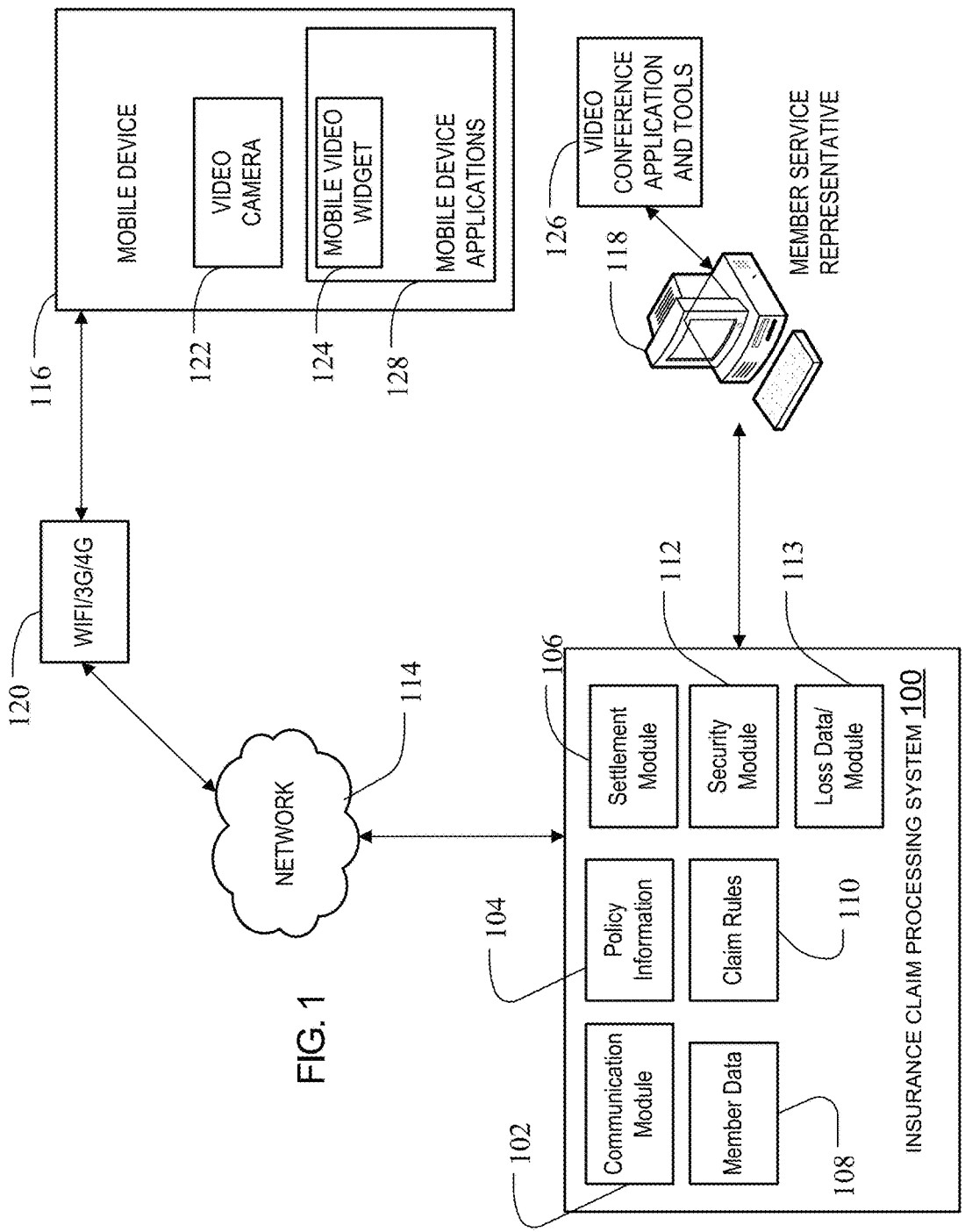
FIG. 1 is a block diagram depicting a system for conducting insurance claim processing in accordance with an embodiment of the present invention.

FIG. 1 illustrates one suitable insurer system 100 for facilitating insurance claim processing transactions. The insurer system 100 includes an insurance policy member data database, which is configured to store various types of information used to process insurance claims. The information stored in the member database may include account information for users of the system participating in a transaction. The user information may include information such as name, e-mail address, telephone number, network address, physical address, insurance claim transaction records, preferred communication methods, security data, policy holder financial account information, and the like. In the system 100 of FIG. 1, the member database is in communication with policy information module 104, settlement module 106, and insurance claim rule database 110.

In one embodiment, communication module 102 and/or other system modules are configured to interact with one or more policy holders through a communication network 114. Alternatively, the modules within the insurance claim processing system 100 may interact with one another internally. In one embodiment, the communication module 102 may be or may include a web server, telephone switch, DSLAM (digital subscriber line access multiplexer), or the like. In different embodiments, the modules and databases of the insurance claim processing system 100 may be implemented on a single computer or may be distributed over two or more computers in a network. The modules may consist of software for execution on a single processor system or a multiple processor system. Alternatively, the modules may be a mixture of hardware and software that may be implemented over several networked computers. The settlement module 106, as shown in FIG. 1 and further discussed below, may be part of the system 100 or may be a function provided or controlled by a third party from a separate computer or network in communication with the system 100.

A software application, or a website on the Internet, which is hosted by communication module 102 may serve as a primary access point to the system 100 for insurance policy holders. Alternatively, insurance policy holders may make their initial contact by calling a member service representative (MSR) associated with the system 100 directly by phone. Policy holders may be given account names and passwords with which to access the system 100 after being registered. Other forms of security (e.g., digital certificates, biometric devices, near field communication) may be employed in other embodiments. A settlement module 106 is configured to interface with one or more financial institutions in order to credit policy holders with settlement payments for insurance claims. The financial institution may be any of a number of types, such as a bank, credit card company, brokerage company, or other entity that handles or processes funds. In one implementation, the insurance claim processing system 100 may be configured to use a settlement module 106 that is outside the system 100, for example a server operated by a third party. In other implementations, the settlement module 106 may be part of the system 100 and thus operated by the same entity as the rest of the components of system 100.

Security module 112 may cooperate with one or more of the other modules or databases to apply, insure or enforce security for insurance claim processing, including fund transfer and actions related to the processing and funds transfers. In one embodiment, digital signatures may play a large part of the security scheme. DSA (digital signature algorithm), a variant thereof (e.g., ECDSA or elliptical curve DSA), RSA or other digital signature protocol may be used. Symmetric cryptographic schemes such as DES (digital encryption standard) may also be applied in the same or different embodiments. Message authentication codes may be used to verify the integrity and authenticity of messages exchanged between the system and a policy holder.

The illustrated system may communicate with policy holders through various types of communication media. Communication network 114 may comprise a traditional wired network and/or a wireless network usable by portable devices such as portable computers, smartphones, etc. Therefore, policy holders may interact with the system 100 by operating mobile devices 116 such as a portable client computer, tablet, wireless telephone (such as a smartphone) and/or other devices capable of communicating with communication network 114 or communication module 102. The mobile device 116 may communicate with the member service representative and insurance claim processing system 100 over a wireless connection with a cellular or internet data routing system 120, such as a WiFi, 3G or 4G network, via a network 114.

In one embodiment, the mobile device 116 may have web browsing capabilities such that communication with communication module 102 may be made over a standard web interface. Also, the mobile device 116 preferably includes a video camera 122, or is connected with a video camera. Alternatively, or concurrently, the mobile device 116 employed by a policyholder to communicate with the system 100 may incorporate a series of instructions for interacting with the system 100. For example, in one embodiment a mobile device 116 may include a downloaded program or applet that allows the policy holder to access his or her specific insurance policy account(s) while connected to the system 100, along with a separate or integrated mobile device application 128 that may include a video widget 124 having any necessary libraries or data to work with the video conference application and tools 126 stored on the MSR computer 118 to implement the video streaming discussed herein. In the discussion below, it is assumed that the policy holder already has a policy with the insurance company that uses the insurance claim processing system 100.

The member service representative may be part of the insurance company that issued the policy for the policy holder and located at the same location or a different location than the other components of the insurance claim processing system 100 and may communicate over any of a number of wired or wireless networks. In one implementation, utilizing the video streaming mechanism discussed herein the member service representative 118 may be the person who not only issues/maintains the policy, but also can act as an adjuster that is assigned responsibility for various loss claims. Other insurance company employees may include a physical damage specialist (not shown) who may be the person who has a managerial/approving role for damage estimates and an appraiser (or body shop appraiser) who writes the estimate for repairing the damage. These and other insurance company employees may communicate electronically with each other and the system 100 from respective computers over wired or wireless networks using similar devices as described for the policy holders above. Although, as discussed in greater detail below, embodiments of the invention described herein work to eliminate or reduce the need for adjusters or other property damage experts to travel to assess property damage, these claims processing participants will be necessary for certain scenarios falling outside the automated scenarios described herein.

Figure 2:
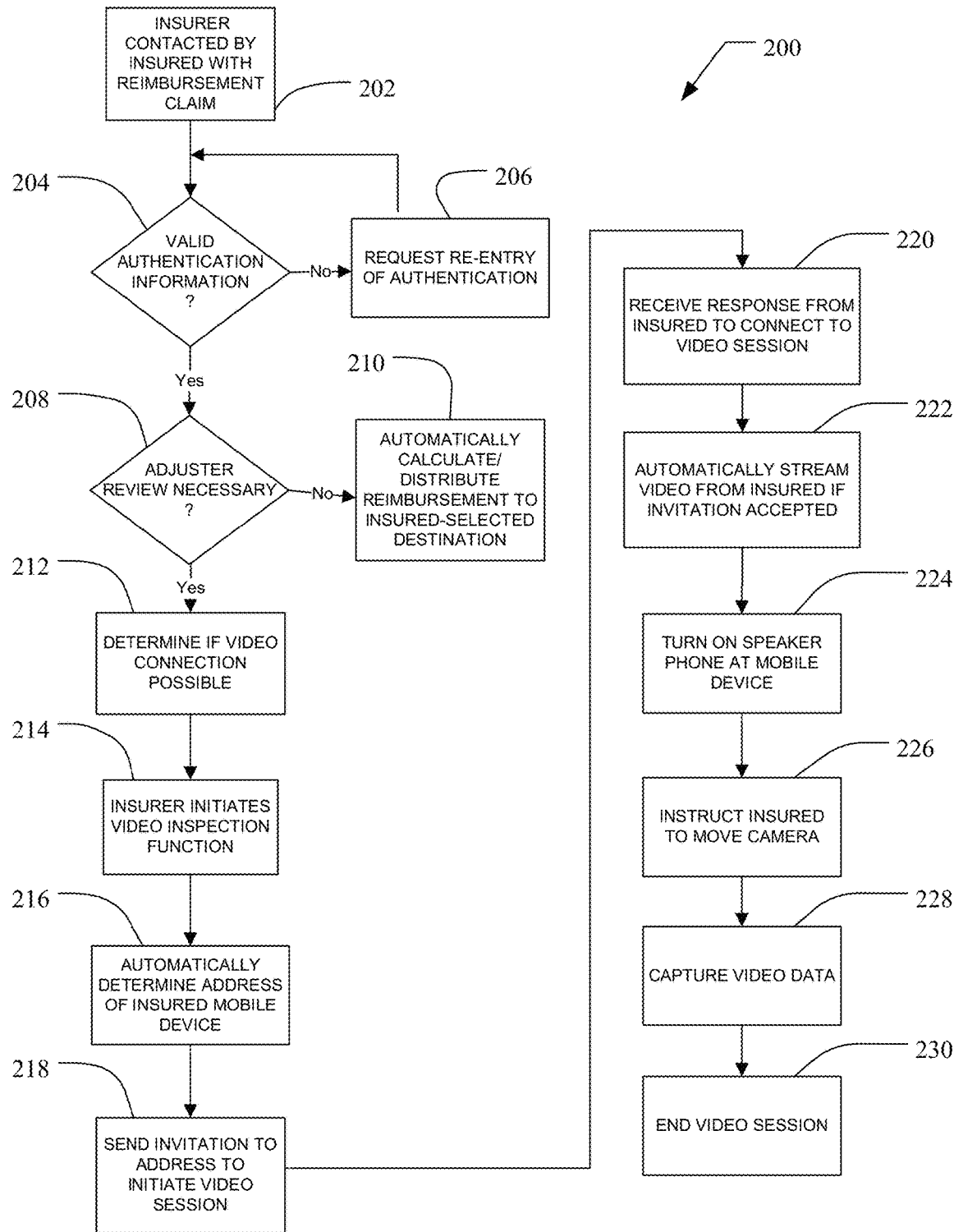
FIG. 2 illustrates a flow diagram of an insurance claim processing method for utilizing streaming video according to an embodiment.

Referring now to FIG. 2, a method of processing an insurance claim, utilizing video streaming, is illustrated. The policyholder (insured) may first contact the insurance claim processing system 100 with a claim (at 202). In one embodiment, the initial contact with the insurance claim processing system 100 by the insured may be made via a web browser where a member enters an ID and password or other authentication information and logs into an already existing insurance account. Alternatively, the insured may call up a member service representative (MSR) at the insurance company by telephone (either a mobile device or a plain old telephone system (POTS) land-line telephone), provide authentication information to the MSR and then discuss their claim. If the authentication information received at the insurance claim processing system is not valid, the system requests the insured try again (at 204, 206), otherwise the process proceeds (at 204, 208).

After receiving valid authentication information from the insured, an electronic workfile for the claim may be automatically established by the system 100 using information already contained in the member data 108, claim rules 110, policy information 104 or other databases. The MSR will collect information from the insured to determine if further review, and an adjuster examination of the damage, is necessary (at 208). The MSR 118 may collect basic loss information from the insured that it is automatically stored in a loss data/module 113 at the insurance claim processing system 100 that persistently stores documents for claims and associated the document with appropriate claim files. The documents stored in the loss data/module 113 may be videos, photos, voice recordings, faxes and any of number of other reproducible media related to an insurance claim.

In some instances, the MSR may understand the damage reported and can assess an immediate monetary value on the insured's policy without a separate adjuster review (at 208). The MSR can find the member's insurance account to see what the reimbursement limits and rules are and either prepare the estimate with a recommended payout, or in some instances fund the insured's chosen deposit account with payment right away (at 210). In these instances, time is saved and an adjuster house call can be completely avoided. In other instances, such as expanded on below, the MSR may need to gather more information and may initiate a streaming video session with the insured to further assess the claim. If, after gathering streaming video from the insured as detailed below, the MSR understands the damage reported and can assess an immediate monetary value on the insured's policy, then the MSR can initiate a payout to the insured as outlined above and still avoid an in-person adjuster visit to the insured. Finally, if even after the streamed video session the MSR is not in a position to estimate the damage and pay, an adjuster may be sent out to gather more information.

In instances where the MSR determines that the claim may be complex and the extent of damages is not well understood, or where the claim is suspicious and the insurer needs to understand more about the claim to make a reasonable assessment, the MSR may explain to the insured that more information is necessary and suggest a streaming video session as noted above. To determine whether if video streaming is an option, the MSR can inquire if the insured has a portable device available that can act as a video camera (at 212). As noted above, suitable portable devices may include cell phones, tablets, laptop computers, and other portable devices having a video camera and the ability to stream video over an Internet connection. If the insured responds that they do have an appropriate device, the MSR may explain that the device will need to be connected to the internet through a Wi-Fi, 3G, 4G or other standard connection technology.

The MSR may instruct an application on the MSR desktop computer to initiate a remote video inspection function, for example to open a virtual video conference room to prepare to receive streaming video from the insured's mobile device to obtain a streaming video view of the damage to the property (e.g., home property damage) (at 214). The MSR may solicit the address of the insured's mobile device or, with the MSR application and via the member data database 108 or other databases in the insurance claim processing system 100 in communication with the MSR computer, automatically determine the address of the insured's mobile device having video capability. The address may be a URL address, an email address, mobile telephone number or any other address that identifies, or can be used to reach, the insured's mobile device (at 216). With the retrieved address, the MSR computer 118 may invite the insured to join the video conference (at 218). A one-way video conference, where the video camera 122 on the insured's mobile device 116 sends streaming video to the MSR computer 118, is preferably automatically started when the insured's positive response to the invitation is received (at 220, 222). Although the established video connection is preferably one-way for only streaming video from insured device to MSR computer 118, in other embodiments a two-way video link may be established.

The manner in which the MSR establishes the video connection and invites the insured to join/start the one-way streaming video session may vary. In one embodiment, inviting the insured to establish a video link may include transmitting an invitation message to the insured mobile device. The message from the MSR may be provided in a number of different ways. For example, the MSR may send a message to invite the member to join a video conference via email from the MSR's computer to the insured using the determined address. The insured may then open the email, click an Internet link that has been automatically provided by the MSR with the email sent by the MSR and will automatically join the video conference upon selecting the link and accepting the invitation. Again, the MSR may obtain the email address for the member automatically through the insurance system insured database when the insured initially provides identification and authentication information at the beginning of the session or call. Alternatively, rather than an email invitation to initiate the video session, the MSR may send, via the application on the MSR computer, a SMS text message to the insured's device with an appropriate link. The insured may accept the message and start the video conference communication with the MSR.

In another alternative, the MSR may push a message to the insured's mobile device if it is running a mobile application from the insurer. The insurer's mobile application may recognize the message from the MSR when it is received and automatically start communication via video with the insurance processing system. In another embodiment, the MSR may direct the insured to open a webpage at a specified address and enter a one-time or short-time-use password. The insured will be allowed to connect to the MSR's video session once the insured navigates to the webpage with the mobile device and enters the password. In yet another alternative embodiment, the MSR may direct the member to enter a code or a sequence on the insurer's mobile application 128 running on their mobile device 116. This will place the mobile device 116 (e.g. mobile phone) into an "answer a call" mode. The MSR may then call into the mobile device of the insured with a shared video stream where the device answers and video begins to stream.

Concurrently, with establishing a one-way video link from the camera of the user's mobile device to the screen of the MSR computer, a speakerphone is engaged on the mobile device (at 224). The speaker of the insured's mobile device may be turned on by a command sent from the insurance processing system and MSR computer or the command may be downloaded automatically upon clicking a link or accepting a video conference invitation at the insured's mobile device.

Once the video link is established from the user's mobile device to the MSR computer, where the MSR can see streaming video coming from the insured's mobile device, the MSR may direct the insured to point the camera at the areas of damage that are part of the claim (at 226). For example, the insurance company MSR may ask the insured to "now show the ceiling" or "now show the wall" of the area of the property that has been damaged to provide hints and coax the insured to point to the pertinent areas on the property. The speakerphone allows the insured to continually point and sweep the camera at the MSR's direction without having to move back and forth between bringing the phone to their ear and then realigning it with whatever object/area the insured needs to video for the MSR. The MSR computer 118 and/or the computer or computers of the insurance claim processing system 100 stores video information streamed from the insured's mobile device (at 228). The streaming continues as a one-way video conference and the audio as a two-way audio conference until the MSR decides to end the call by thanking the insured and cutting off the video stream, or both the video stream and the audio connection (at 230). If the MSR has enough information at this point, after observing the streaming video that is also now stored in the loss data/module 113, to estimate the damage and assess an immediate monetary value on the insured's policy, the MSR may generate a reimbursement payout recommendation or initiate a direct payment as noted previously. If the information available to the MSR is insufficient to assess a monetary value for the claim even after the streaming video session, then an in-person adjuster visit may be scheduled to further assess the damage.

During the video capture session, the MSR computer 118 and insurance processing system 100 will capture appropriate video, and may selectively capture screenshots from the mobile video stream. The MSR may also utilize an application at the MSR computer 118 to zoom in or zoom out and otherwise control the insured's mobile device camera 122. The MSR, in one embodiment, may use the application at the MSR computer to turn on a mobile device camera flash for illumination. The MSR may also annotate items on a captured image as, or after, video is received from the mobile device. In alternative embodiments, an application on the mobile device of the insured may also permit the insured to annotate items on the captured image. Most of the control of the session is up to the MSR and the insured is simply holding and directing the device as instructed by the MSR. During the video session, the MSR may select from the MSR application an option to share an image or document in a two way exchange with the insured so the insured can see an image, for example a captured image from the video stream, and both the MSR and the insured may annotate in a back and forth manner that image. Once the MSR terminates the video, or video and audio call, the MSR may manage images and video stream from the session and append some or all of this information, along with other information pulled from the database information available to the MSR, and notes and comments from the MSR regarding the remote video session and the insured's claim, with all the information for the claim in the electronic claim workfile that was opened.

As noted above, when the initial one-way video conference is established, it may be established by the application 126 running on the MSR's computer 118 automatically using session initialization protocol (SIP) to automatically create a Uniform Resource Locator (URL) to send to the insured. The invitation is sent to the insured's known email address acquired from the database at the insurance processing system including a link to the URL that allows the insured to then handshake with the insurance claim processing system 100 and accept the MSR invitation for the video call on the mobile device 116.

In order to facilitate the ability of an insured's mobile device 116 to handle the one-way video and two-way audio conference to allow for remote adjusting and review of an insurance claim, the insurance claim processing system 100 may provide a mobile device library or embeddable program 124 that may be controlled in the mobile application 128 on the insured's device 116. This library or embeddable program may be referred to as a "video widget" 124. Any of a number of mobile device operating systems may be used to implement the mobile application 128 and video widget 124, for example Apple iOS platform or the Android platform. The video widget, distributed from the insurance claim processing system 100 either at the time a session is being arranged or from a previous download, may provide the user with a display showing the insurance company logo and a message identifying that a secure remote video session is starting.

The widget 124 may also provide real-time time and date, as well as GPS coordinates from the mobile device 116. The information may be encoded into the video stream as noted above. When the mobile application 128 on the insured's mobile device first calls the video widget 124 as part of setting up the one-way video call, the widget may receive a series of XML tags/values. These values may be accepted by the video widget and passed on to the MSR application 126 at the MSR computer 118 where they may be decoded. Typical metadata that could be passed on in this manner might include insured name, insured policy number or identification number, telephone number for the insured, the device ID of the insured's mobile device 116, and so on. At the receiving end, the MSR desktop application used by the MSR in establishing the connection and managing the insurance processing and adjustment process may include basic application programming interfaces (APIs) for including a video session in a browser-based interface.

In one embodiment, the video data is preferably generated at the insured's mobile device 116 with some anti-fraud information that may be saved as part of the video stream or as an appended metadata file and provided electronically to the MSR with the video stream. This anti-fraud information may be information that provides the MSR, and the insurance claim processing system 100 generally, with some sense that the insured is at the property in question and that the video is current information rather than pre-recorded. The application 128 on the insured's mobile device 116, which was created by the insurance claim processing system 100 and provided previously to the insured by an earlier download, may preferably automatically tag the video session by integrating information into the video stream. For example, tagging may be time and date information that may be displayed in an overlay in a corner of the video stream image. In one embodiment, GPS information, for example a location or an orientation/bearing may also be included as part of the video stream to provide anti-fraud information. This location information may also be displayed in a corner of the video stream. Location information may be in any of a number of forms, for example a latitude and longitude format, a city and state format, or any of a number of location granularity formats. Using data from the member data database 108, the insurance claim processing system and the MSR computer 118 may determine if the GPS data, or other information received in the streamed video, matches the location information for the insured property (if the policy relates to a property insurance policy). If the information does not match, the insurance claim processing system 100 may flag the session as potentially fraudulent, causing the MSR to follow-up later or to cancel the one-way video streaming session.

Figure 3:
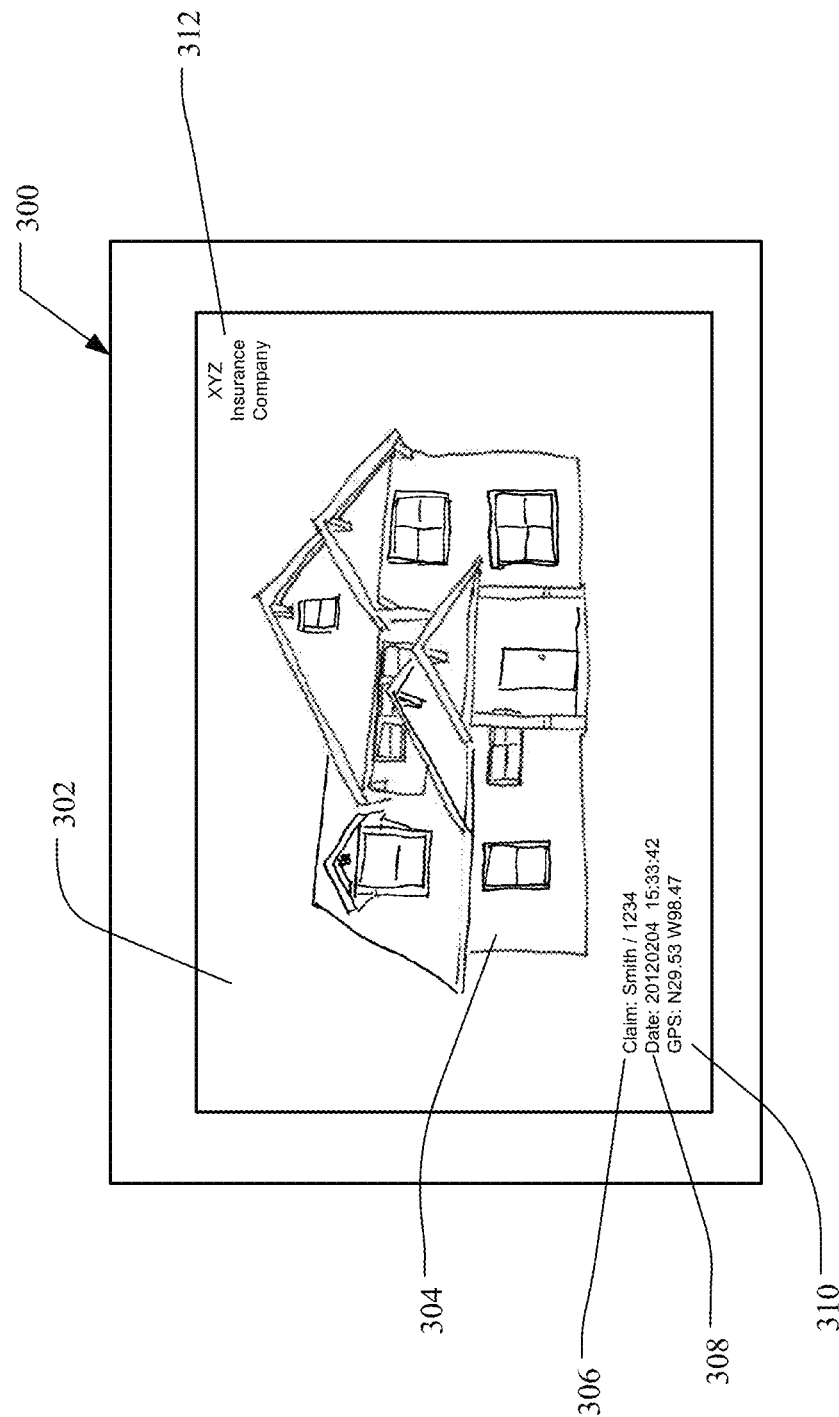
FIG. 3 illustrates a sample streaming video image as shown on a display of a customer service representative.

As illustrated in FIG. 3, a display screen 302 of an MSR computer 118 in the insurance claim processing system 100 is shown displaying an example of a snapshot of the video stream 302 with overlays. The display screen 302 may show the property being remotely reviewed by the MSR, and in a corner of the video stream 302 the claim information 306 including insured name and claim number or policy number, date and time 308, and location information 310. The MSR, with the MSR computer 118 and video conference applications and tools 126 associated with the MSR computer, and/or the insurance claim processing system 100 generally, may also customize the video stream with an overlay of a logo 312 for the insurance company. In one embodiment, the MSR computer 118 and software applications 126 thereon, may remotely control the mobile device 116 via the mobile video application 124 on the mobile device 116, to instruct the mobile device to generate and overlay date, time and/or location information onto the video stream.

Figure 4:
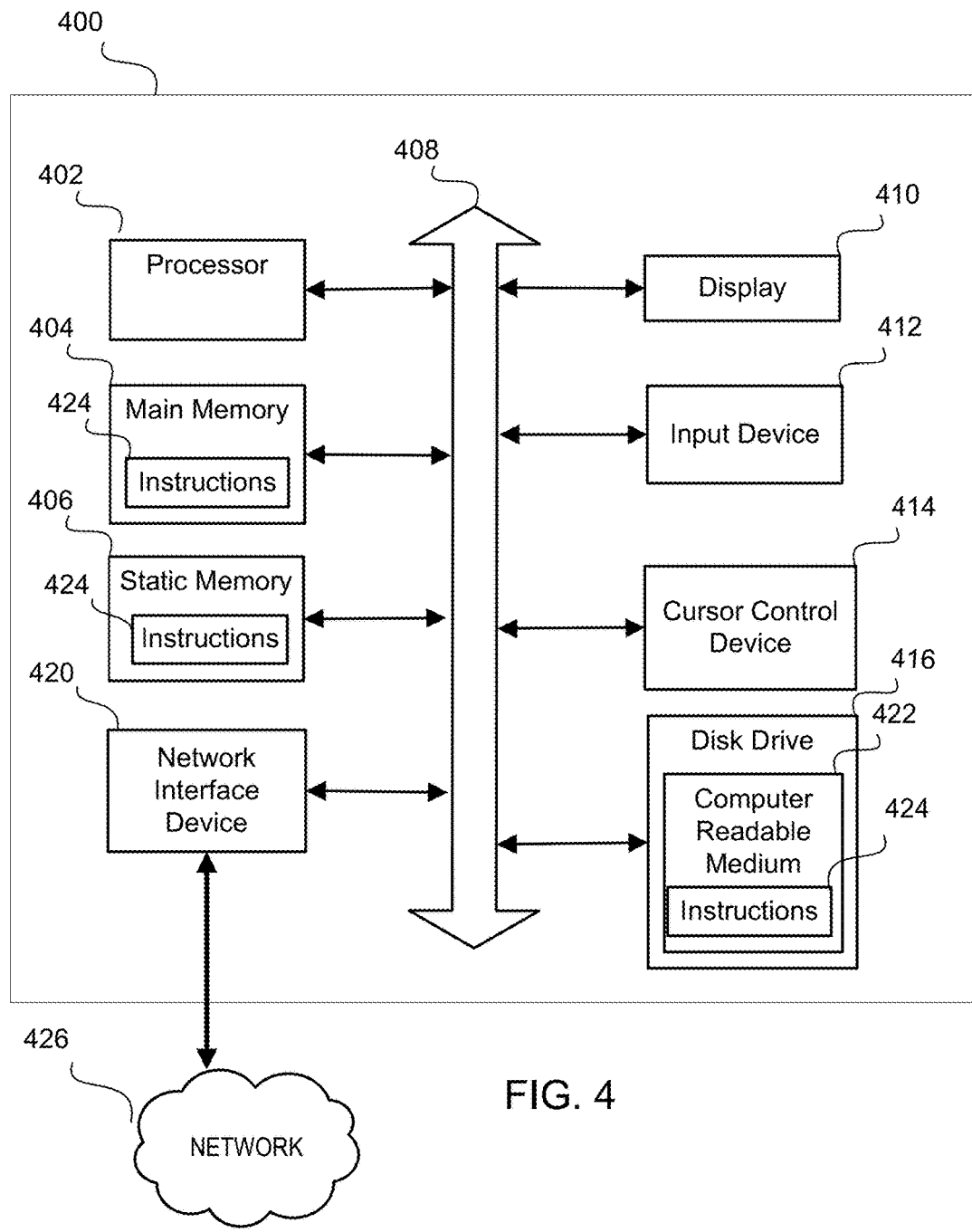
FIG. 4 is a diagram of a general purpose computer system that can be modified via computer hardware or software to be customized and specialized so as to be suitable for use as or in the mobile device, the insurance claim processing system or any other element of FIG. 1.

Referring to FIG. 4, an illustrative embodiment of a general computer system that may be used for one or more of the components shown in FIG. 1, or in any other insurance claim processing system configured to carry out the methods discussed above, is shown and is designated 400. The computer system 400 can include a set of instructions that can be executed to cause the computer system 400 to perform any one or more of the methods or computer-based functions disclosed herein. The computer system 400 may operate as a standalone device, or may be connected using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer ("PC"), a tablet PC, a set-top box ("STB"), a personal digital assistant ("FDA"), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, such as a central processing unit ("CPU"), a graphics processing unit ("GPU"), or both. Moreover, the computer system 400 can include a main memory 404 and a static memory 406 that can communicate with each other via a bus 408. As shown, the computer system 400 may further include a video display unit 410, such as a liquid crystal display ("LCD"), an organic light emitting diode ("OLEO"), a flat panel display, a solid state display, or a cathode ray tube ("CRT"). Additionally, the computer system 400 may include an input device 412, such as a keyboard, and a cursor control device 414, such as a mouse. In some embodiments, there may be additional input devices 412 including an image capture mechanism such as a digital camera, video camera, scanner or the like. The computer system 400 can also include a disk drive unit 416, a signal generation device, such as a speaker or remote control, and a network interface device 420.

In a particular embodiment, as depicted in FIG. 4, the disk drive unit 416 may include a non-transitory computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories, such as flash memory. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Embodiments the methods disclosed herein can be implemented on existing insurance or financial services systems and/or other known financial industry systems. Both insurance claim processing systems and other known claims processing systems utilize a combination of computer hardware (e.g., client and server computers, which may include computer processors, memory, storage, input and output devices, and other known components of computer systems; electronic communication equipment, such as electronic communication lines, routers, switches, etc.; electronic information storage systems, such as network-attached storage and storage area networks) and computer software (i.e., the instructions that cause the computer hardware to function in a specific way) to achieve the desired system performance.

A system and method has been described for permitting an insurance claim to be handled by a remotely located MSR acting as an adjuster via a one-way streamed video session. The streamed video session may be automatically set up and controlled by the MSR computer and insurance claim processing system. A mobile application and video widget provided by the insurance claim processing system in advance of the video session, or concurrently in response to a request to establish such a video streaming session, permits the MSR to control features of a video session and utilize a speakerphone feature of a policy holder's mobile device to obtain damage information quickly and efficiently, without the need for a personal visit from an insurance company adjuster to the insured property. Although the example of property insurance, such as a homeowner's policy, has been generally described with respect to the video streaming claim processing embodiments above, any of a number of types of insurance (e.g. auto, health, etc.) may also integrate some or all of the features and efficiencies of the disclosed herein.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method for damage assessment comprising:
in a damage assessment system having a memory and a processor in communication with the memory, the processor:
receiving, from a mobile device associated with a policy holder, a query regarding a damage assessment from the policy holder located remotely from the damage assessment system for processing the damage assessment, the query further including mobile device capability information indicating the mobile device is capable of streaming video;
determining, in response to the information included in the query, whether the mobile device is capable of streaming video to the damage assessment system; and
in response to determining the mobile device is capable of streaming video:
generating an electronic invitation to a one-way streaming video session, the electronic invitation including an interactive link for controlling the mobile device to initiate streaming video to the damage assessment system upon activation of the interactive link;
transmitting the electronic invitation to the mobile device;
upon receiving an acceptance of the electronic invitation based on activation of the interactive link, controlling the mobile device to initiate the one-way video session;
receiving, from the mobile device, real-time streaming video based on the initiation of the one-way video session, the real time streaming video containing embedded metadata;
decoding the embedded metadata; and
appending received video and metadata from the real-time streaming video to a damage assessment workfile at the damage assessment system.

2. The method of claim 1, further comprising, after initiating the one-way video session, remotely controlling the mobile device from the damage assessment system.

3. The method of claim 2, wherein remotely controlling the mobile device comprises adjusting a zoom of a video camera of the mobile device.

4. The method of claim 2, wherein remotely controlling the mobile device comprises controlling a flash on the mobile device.

5. The method of claim 2, wherein remotely controlling the mobile device comprises remotely turning on a speaker of the mobile device.

6. The method of claim 1, wherein receiving the query comprises receiving identification and authentication information from the policy holder, automatically retrieving policy information for the policy holder from the memory upon receiving the identification and authentication information and generating an electronic claim file for the claim of the policy holder.

7. The method of claim 1, wherein appending received video comprises, receiving real-time streamed video from the mobile device, and automatically displaying the real-time streamed video to a customer representative associated with the damage assessment system.

8. The method of claim 7, further comprising capturing screenshots from the real-time streaming video in response to receiving instructions from the customer representative and storing the captured screen shots in the memory in addition to the streaming video.

9. The method of claim 7, further comprising annotating at least one of the streaming video or captured screen shots with indicia in response to a command received from a customer representative in communication with the damage assessment system.

10. The method of claim 1, further comprising receiving location information from the mobile device and verifying that the location information corresponds with a location of property associated with a policy of the policy holder.

11. The method of claim 1, further comprising, after initiating the one-way video session, transmitting control information in order to modify the real time streaming video.

12. The method of claim 11, wherein the control information comprises control commands indicative, to the mobile device, of remote control to modify the real time streaming video.

13. The method of claim 11, wherein the control information comprises display commands indicative, to the mobile device, to display to the insured to control the real time streaming video.

14. A damage assessment system for processing a damage assessment utilizing streaming video, the system comprising:
a memory storing processor executable instructions for processing damage assessments; and
a processor in communication with the memory, the processor configured to execute the processor executable instructions to:
receive, from a mobile device associated with a policy holder, a query regarding an damage assessment from the policy holder located remotely from the damage assessment system for processing a damage assessment, the query further including mobile device capability information indicating the mobile device is capable of streaming video;
determine, in response to the information included in the query, whether the mobile device is capable of streaming video to the damage assessment system; and
in response to determining the mobile device is capable of streaming video:
generate an electronic invitation to a one-way streaming video session, the electronic invitation including an interactive link for controlling the mobile device to initiate streaming video to the damage assessment system upon activation of the interactive link;
transmit the electronic invitation to the mobile device;
in response to receiving an acceptance of the electronic invitation based on activation of the interactive link, control the mobile device to initiate the one-way video session;

receive, from the mobile device, real-time streaming video based on the initiation of the one-way video session, the real time streaming video containing embedded metadata; and append received video and metadata from the real-time streaming video to a damage assessment workfile at the damage assessment system.

15. The system of claim 14, wherein the processor is further configured to, after initiating the one-way video session, remotely control the mobile device from the damage assessment system.

16. The system of claim 15, wherein the processor is further configured to remotely control the mobile device by adjusting a zoom of a video camera of the mobile device.

17. The system of claim 15, wherein the processor is further configured to remotely control the mobile device by controlling a flash on the mobile device.

18. The system of claim 15, wherein the processor is further configured to remotely control the mobile device by remotely turning on a speaker of the mobile device.

19. The system of claim 14, wherein in response to receiving the query, including receiving identification and authentication information from the policy holder, the processor is configured to automatically retrieve policy information for the policy holder from the memory and generate an electronic claim file for the claim of the policy holder.

20. The system of claim 14, wherein to append received video, the processor is configured to append received real-time streamed video from the mobile device, and automatically display the real-time streamed video to a customer representative associated with the damage assessment system.

21. The system of claim 20, wherein the processor is further configured to capture screenshots from the real-time streaming video in response to receiving instructions from the customer representative, and to store the captured screen shots in the memory in addition to the streaming video.

22. The system of claim 20, wherein the processor is further configured to annotate at least one of the streaming video or captured screen shots with indicia in response to a command received from a customer representative in communication with the damage assessment system.

23. The system of claim 14, wherein the processor is configured to, in response to receiving location information from the mobile device, verify that the location information corresponds with a location of property associated with a policy of the policy holder.

24. The system of claim 14, wherein the processor is further configured to, after initiating the one-way video session, remotely control the mobile device from the damage assessment system in order to modify the real time streaming video.

* * * * *